3,634,285
SILICONE RELEASE EMULSION
Howard Larry Brooks, Toledo, Ohio, assignor to Stauffer-Wacker Silicone Corporation, Adrian, Mich.
No Drawing. Filed Mar. 24, 1969, Ser. No. 809,994
Int. Cl. B01j 13/00
U.S. Cl. 252—312     9 Claims

ABSTRACT OF THE DISCLOSURE

An emulsion composition comprising (a) from 20 to 50 percent by weight of an organopolysiloxane having from 1 to 3 monovalent hydrocarbon radicals or halogenated monovalent hydrocarbon radicals per silicon atom, (b) from 0.5 to 5.0 percent by weight of a trimethyl nonyl ether of polyethylene glycol, (c) from 0.2 to 3.0 percent by weight of a polyoxyethylene sorbitol oleate, (d) from 0.10 to 5.0 percent by weight of a partial salt of a phosphate ester of nonyl phenol, and the balance of the emulsion being water.

---

The invention relates to silicone emulsions, particularly to organopolysiloxane emulsions and more particularly to stable organopolysiloxane release emulsions, and to a method for preparing the same.

Many emulsions have a tendency to separate into phases upon storage and/or exposure to elevated temperatures which is often referred to in the art as "breaking or creaming." This phenomena results in a non-uniform distribution of components throughout the emulsion which is especially serious, particularly in mold release compositions where a uniform composition is necessary for optimum release properties. Consequently, emulsions which have a tendency to "break or cream" are generally ineffective as release agents.

Therefore, it is an object of this invention to prepare stable emulsions. Another object of this invention is to prepare stable organopolysiloxane-water emulsions. Still another object of this invention is to prepare emulsions having particles of less than 0.5 micron in size. A further object of this invention is to prepare organopolysiloxane emulsions which will not "break or cream" after repeated freezing and thawing. Still a further object of this invention is to provide organopolysiloxane-water emulsions which will remain stable on storage for several months or years.

The foregoing objects and others which will become apparent from the following discussion are accomplished in accordance with this invention, generally speaking, by preparing water emulsions composed of (a) from 20 to 50 percent by weight based on the total emulsion of an organopolysiloxane having the formula:

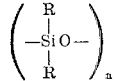

wherein the R(s), which may be the same or different, represent monovalent hydrocarbon radicals or halogenated monovalent hydrocarbon radicals and $n$ is a number greater than 10, (b) from 0.5 to 5.0 percent by weight of a trimethyl nonyl ether of polyethylene glycol, (c) from 0.2 to 3.0 percent by weight of polyoxyethylene sorbitol oleate, (d) from 0.10 to 5.0 percent by weight of a partial salt of a phosphate ester of nonyl phenol, and (e) from 50 to 80 percent by weight of water.

Radicals represented by R above are alkyl radicals having from 1 to 18 carbon atoms, e.g., methyl, ethyl, propyl, butyl, hexyl, octyl, dodecyl, hexadecyl, and octyl decyl; aryl radicals, e.g., phenyl and naphthyl; alkenyl radicals, e.g., vinyl and allyl; alicyclic radicals, e.g., cyclohexenyl, cyclopentyl, and cyclohexyl; alkaryl radicals, e.g., tolyl and xylyl; and aralkyl radicals, e.g., benzyl, as well as the halo-substituted radicals enumerated above.

The organopolysiloxane may be any organosilicon compound having an average of from 1.75 to 2.25 organic radicals per silicon atom. Although the organopolysiloxane may be a liquid, solid, or gel, it is preferred that the organopolysiloxane used in this invention be substantially linear and have a viscosity of from about 50 to 60,000 centistokes at 25° C. Solid or gel-like organopolysiloxanes are operative herein so long as they can be dissolved in an organic solvent, such as toluene, benzene, naphtha, and other petroleum solvents.

It has been found that the emulsifying agents employed in this invention provide an emulsion system which is significantly better and more stable than emulsions heretofore prepared with any of the emulsifiers alone or in combination with other agents. Thus, when a mixture comprising polyoxyethylene sorbitol oleate and a trimethyl nonyl ether of polyethylene glycol containing from 6 to 14 moles of ethylene oxide is used in combination with a sodium salt of a phosphate ester of an ethylene oxide adduct of nonyl phenol, a significantly better emulsion is obtained than could have been prepared from any of the individual agents.

In a preferred embodiment, the emulsions of this invention are prepared in a mechanical mixing apparatus by adding emulsifying agents to a predetermined amount of water, the amount of water being equal to or less than the total weight of the emulsifying agents, and thereafter adding the organopolysiloxane to the resulting emulsifier blend to form a paste-like composition. Depending upon the final concentration, the remaining amount of water is then slowly added to the thus formed paste-like composition with agitation to form a homogeneous emulsion.

In still another embodiment, the organopolysiloxane may be added to the emulsifying agents containing an amount of water equal to the weight of the emulsifying agents in a mechanical mixer to form a paste-like composition. A predetermined amount of water, preferably from about 5 to 50 percent by weight based on the emulsion, is slowly added to the paste-like composition and then passed through a colloid mill or homogenizing apparatus. The remainder of the water is then added to the emulsion and the emulsion again passed through a colloid mill or homogenizing apparatus at a pressure of at least 4,000 p.s.i.

Surprisingly, it has been found that emulsions prepared by the preferred embodiment are considerably more stable than similar emulsions prepared using a colloid mill or a homogenizing apparatus.

The emulsions prepared in accordance with the invention are of extremely fine particle size, i.e., the dispersed siloxane particles are less than 0.5 micron and preferably less than 0.1 micron in size. These emulsions also exhibit improved stability as exemplified by the fact that they can be centrifuged at 2,500 r.p.m. for an hour or diluted to almost any concentration without separation. Also, these emulsions may stand for months without any visible separation or "cream" formation.

Other additives and fillers, such as rust inhibitors and antioxidants, which may be beneficial in these emulsions may be included in the compositions of this invention.

The emulsions of this invention can be employed for lubricants, release agents, or for coating compositions. Also, these compositions may be used in a padding bath for the treatment of textile fibers.

The following examples are given for purposes of illustration and are not to be considered as limiting the scope of the invention. All parts are by weight unless otherwise indicated.

EXAMPLE 1

An emulsion was prepared by adding 70 parts of dimethylpolysiloxane having a viscosity of about 350 centistokes at 25° C. to a mechanical mixer containing 5 parts of water, 4 parts of trimethyl nonyl ether of polyethylene glycol (molecular weight about 626) and containing from 6 to 14 ethylene oxide radicals per molecule (available as Tergitol TMN-10 from Union Carbide Corporation), 1.0 part of polyoxyethylene sorbitol oleate (saponification number 102-108 and hydroxyl number 25-35) (available as Atlox 1087 from Atlas Chemical Industries, Inc.) and about 1.0 part of a partial sodium salt of a phosphate ester of an ethylene oxide adduct of nonyl phenol containing from 4 to 10 ethylene oxide radicals per molecule (molecular weight about 1,112 and an acid number 7-8) (available as Gafac LO-529 from General Aniline & Film Corporation). The ingredients were mixed until a paste-like composition was formed and then 113 parts of water and 1.0 part of sodium benzoate were slowly added to the resulting paste-like composition with agitation. The resulting emulsion was filtered and then centrifuged for 1 hour at 2,500 r.p.m. without any apparent separation. A sample of the emulsion was heated for 15 days at 50° C. while a similar sample was subjected to 10 cycles of a freeze-thaw test at temperatures ranging from −20° to +25° C. without any apparent evidence of phase separation. Even after standing for several months on the shelf, there was no apparent evidence of phase separation.

EXAMPLE 2

In a comparative experiment 1.0 part of sodium salt of alkyl aryl polyether sulfate (available as Triton W-30 from Rohm and Haas) was substituted for the partial sodium salt of the phosphate ester of Example 1. After centrifuging a sample of the resultant emulsion for 1 hour at 2,500 r.p.m., a large, clear area was observed at the tip of the centrifuge tube which indicated phase separation. After heating for 5 days at 50° C., a trace of "cream" was present and after 7 days, "cream" and free oil were present. In the freeze-thaw test, a slight trace of "cream" was observed after two cycles.

EXAMPLE 3

An emulsion was prepared by adding 39 parts of a dimethylpolysiloxane having a viscosity of about 1,000 centistokes at 25° C. to a conventional mechanical mixer containing 3 parts of water, 1.5 parts of trimethyl nonyl ether of polyethylene glycol containing from 6 to 14 ethylene oxide radicals per molecule (available as Tergitol TMN-10 from Union Carbide Corporation), 0.2 parts of polyoxyethylene sorbitol oleate (available as Atlox 1087 from Atlas Chemical Industries, Inc.) and 1.5 parts of a partial sodium salt of a phosphate ester of an ethylene oxide adduct of nonyl phenol containing from 6 to 10 ethylene oxide radicals per molecule and having a molecular weight of about 1,112 (available as Gafac LO-529 from General Ainiline Film Corporation), and mixed until a paste-like composition is formed. About 57 parts of water containing 0.8 part of sodium benzoate was slowly added to the thus formed paste-like composition with agitation to form an emulsion having particles of less than 5 microns in size. The resulting emulsion was filtered and the stability of the emulsion determined in accordance with the procedure described in Example 1. No evidence of phase separation or "creaming" was apparent after these tests.

EXAMPLE 4

An emulsion was prepared by slowly adding 20 parts of a dimethylpolysiloxane having a viscosity of about 10,000 centistokes at 25° C. to a mechanical mixer containing 1 part of water, 1.0 part of trimethyl nonyl ether of polyethylene glycol containing from 6 to 14 ethylene oxide radicals per molecule (available as Tergitol TMN-10 from Union Carbide Corporation), 0.25 part of polyoxyethylene sorbitol oleate (available as Atlox 1087 from Atlas Chemical Industries, Inc.), and 0.25 part of a partial sodium salt of a phosphate ester of an ethylene oxide adduct of nonyl phenol (molecular weight of about 1,112) (available as Gafac LO-529 from General Aniline & Film Corporation). The ingredients were mixed until a paste-like composition was formed and then 30 parts of water containing 0.5 part of sodium benzoate was slowly added to the paste-like composition with agitation. The resulting emulsion was filtered and the stability of the emulsion determined by centrifuging a sample at 2,500 r.p.m. for 1 hour. No visible evidence of phase separation was observed after centrification. After heating for 15 days as 50° C., there was no evidence of "cream" or phase separation. Even after 4 cycles of repeated freezing and thawing, only a slight trace of a free oil ring was observed.

EXAMPLE 5

An emulsion was prepared by mixing 70 parts of a dimethylpolysiloxane with 10 parts of water, 4 parts of trimethyl nonyl ether of polyethylene glycol having 6 to 14 ethylene oxide radicals per molecule (available as Tergitol TMN-10 from Union Carbide Corporation), 1.0 part of polyoxyethylene sorbitol oleate (available as Atlox 1087 from Atlas Chemical Industries, Inc.), and 1.0 part of a partial sodium salt of a phosphate ester of an ethylene oxide adduct of nonyl phenol (molecular weight of about 1,112) (available as Gafac LO-529 from General Aniline Film Corporation), and thereafter passing the entire mixture through a homogenizer at 4,000 p.s.i. About 88 parts of water containing 1.0 part of sodium benzoate was added to the homogenized mixture and again passed through the homogenizer at 4,000 p.s.i. The resulting emulsion was unstable as indicated by the formation of "cream" when a sample was centrifuged at 2,500 r.p.m. for 1 hour. "Cream" formation was observed at the end of 4 days when heated to 50° C. Repeated freezing and thawing at temperatures of from −20° C. to +20° C. resulted in "cream" formation after 2 cycles.

Substantially equivalent results were obtained when vinylmethyl-, methylphenyl-, and methylchlorophenyl-polysiloxanes were substituted for the dimethylpolysiloxane of Example 1.

It was observed that emulsions prepared in accordance with this invention exhibit greater stability than emulsions prepared by a colloid mill or homogenizing apparatus. Also, it was observed that an anionic phosphate ester of an ethylene oxide adduct of nonyl phenol provided an emulsion which was far superior to other emulsions heretofore prepared in regard to heat stability, shelf-life, compatibility, and ease of dilution.

What is claimed is:
1. An emulsion composition comprising (a) from 20 to 50 percent by weight of a substantially linear organopolysiloxane having from 1.75 to 2.25 organic radicals per silicon atom, (b) from 0.5 to 5.0 percent by weight of a trimethyl nonyl ether of polyethylene glycol containing from 6 to 14 ethylene oxide radicals per molecule, (c) from 0.2 to 3.0 percent by weight of a polyoxyethylene sorbitol oleate having a saponification number of from 102 to 108 and a hydroxyl number of from 25-35, (d) from 0.10 to 5.0 percent by weight of a partial salt of a phosphate ester of an ethylene oxide adduct of nonyl phenol containing from 4 to 10 ethylene oxide radicals per molecule and an acid number of from 7 to 8, and the balance of the emulsion being water.

2. The composition of claim 1 wherein the partial salt of the phosphate ester is a sodium salt of the phosphate ester.

3. The composition of claim 1 wherein from 50 to 80 percent by weight is water.

4. A method for preparing the composition of claim 1 which comprises mixing in the absence of a homogenizer from 20 to 50 percent by weight of a substantially linear organopolysiloxane having from 1.75 to 2.25 organic radicals per silicon atom with a mixture of emulsifying agents containing (a) from 0.5 to 5.0 percent by weight of a trimethyl nonyl ether of polyethylene glycol containing 6 to 14 ethylene oxide radicals per molecule, (b) from 0.2 to 3.0 percent by weight of a polyoxyethylene sorbitol oleate having a saponification number of from 102 to 108 and a hydroxyl number of from 25 to 35, (c) from 0.10 to 5.0 percent by weight of a partial salt of a phosphate ester of an ethylene oxide adduct of nonyl phenol containing from 4 to 10 ethylene oxide radicals per molecule and an acid number of from 7 to 8, and sufficient water to form a paste and thereafter slowly adding the remainder of the water to the paste to form particles which are homogeneously distributed throughout the emulsion.

5. The method of claim 4 wherein the amount of water added to make the paste composition is not greater than the total amount of emulsifiers.

6. The method of claim 4 wherein the partial salt of the phosphate ester is a sodium salt of the phosphate ester.

7. The composition of claim 1 wherein the organopolysiloxane has recurring units of the formula:

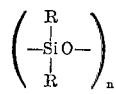

in which the R(s) are selected from the group consisting of monovalent hydrocarbon radicals and halogenated monovalent hydrocarbon radicals and $n$ is a number greater than 10.

8. The method of claim 4 wherein the quantity of water used in making the paste is no greater than the total quantity of emulsifying agents.

9. The method of claim 4 wherein the organopolysiloxane has recurring units of the formula:

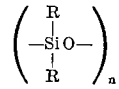

in which the R(s) are selected from the class consisting of monovalent hydrocarbon radicals and halogenated monovalent hydrocarbon radicals and $n$ is a number greater than 10.

References Cited

FOREIGN PATENTS 577,853    6/1959    Canada  _____ 260—29.2M

JOHN D. WELSH, Primary Examiner

U.S. Cl. X.R.

260—29.2; 106—33.22